United States Patent [19]

Schmid

[11] 4,055,286
[45] Oct. 25, 1977

[54] PORTABLE MOUNT FOR RADIOS IN MOTOR VEHICLES

[76] Inventor: Charles F. Schmid, 3408 S. Fourth St., Springfield, Ill. 62703

[21] Appl. No.: 643,616

[22] Filed: Dec. 22, 1975

[51] Int. Cl.² .................................................. B60R 11/02
[52] U.S. Cl. ........................ 224/42.42 R; 224/42.45 R
[58] Field of Search ............... 224/42.42 R, 42.42 A, 224/42.45 R, 29 R, 32 A, 42.11; 325/16, 117, 111

[56] References Cited

U.S. PATENT DOCUMENTS

| | | | |
|---|---|---|---|
| 3,163,287 | 12/1964 | Barnett | 224/42.42 R |
| 3,393,846 | 7/1968 | Cannon et al. | 224/42.42 R |
| 3,561,589 | 2/1971 | Larkin et al. | 224/29 R X |
| 3,658,219 | 4/1972 | Van Ordt | 224/42.45 R X |

FOREIGN PATENT DOCUMENTS

| | | | |
|---|---|---|---|
| 231,632 | 6/1944 | Switzerland | 224/32 A |

Primary Examiner—Robert J. Spar
Assistant Examiner—Jerold M. Forsberg

Attorney, Agent, or Firm—Ralph F. Staubly

[57] ABSTRACT

The disclosure is a quickly and easily attachable and detachable portable mount for radios in automotive vehicles which have a floor hump defining a drive-shaft tunnel. The mount has a base lamina overlying the hump and has at least one lateral lamina hingedly attached to each lateral edge of the base lamina. The laminae straddle and embrace the hump and are made quickly and easily attachable to, and detachable from, the hump by the use of marginally attached strips of tape having minute hooks projecting from its face. The minute hooks firmly grip the nap or loops of the usual carpet covering the floor of the vehicle. The base lamina has attached thereto a support structure formed from a relatively stiff sheet of metal or plastic bent to define an inclined panel adapted to underlie the case of a (citizens' band) radio, and an upright panel to support the elevated edge of the inclined panel. The inclined panel is slotted for adjustable attachment of L-shaped brackets adapted to be bolted thereto and to the radio case. Both panels are perforated for transmission of sound downwardly and outwardly therethrough.

6 Claims, 5 Drawing Figures

U.S. Patent     Oct. 25, 1977     4,055,286
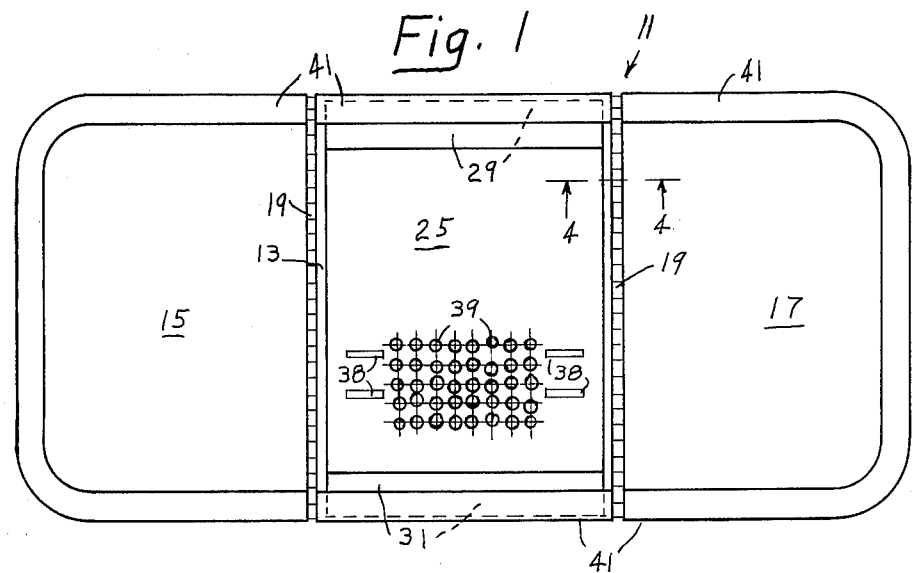
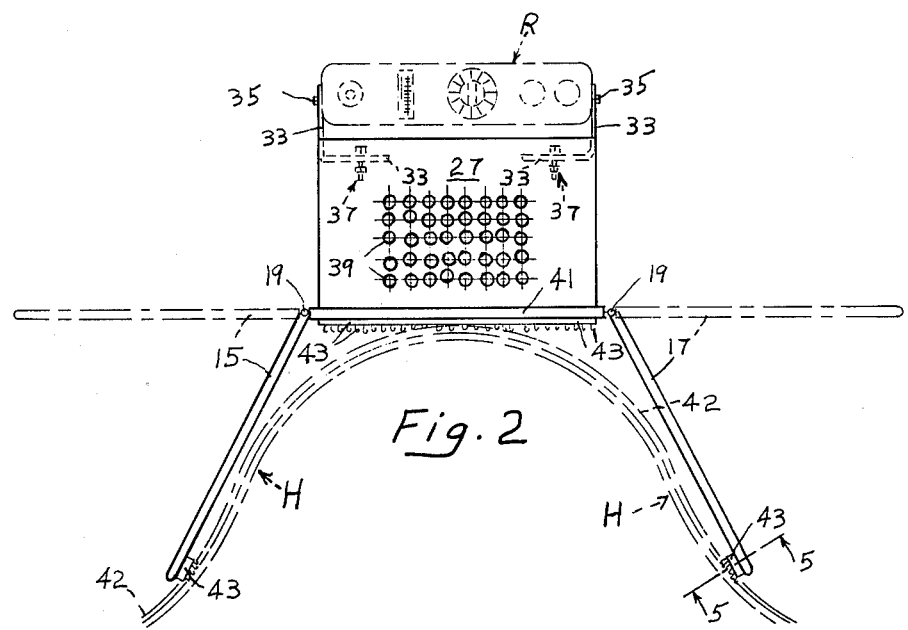
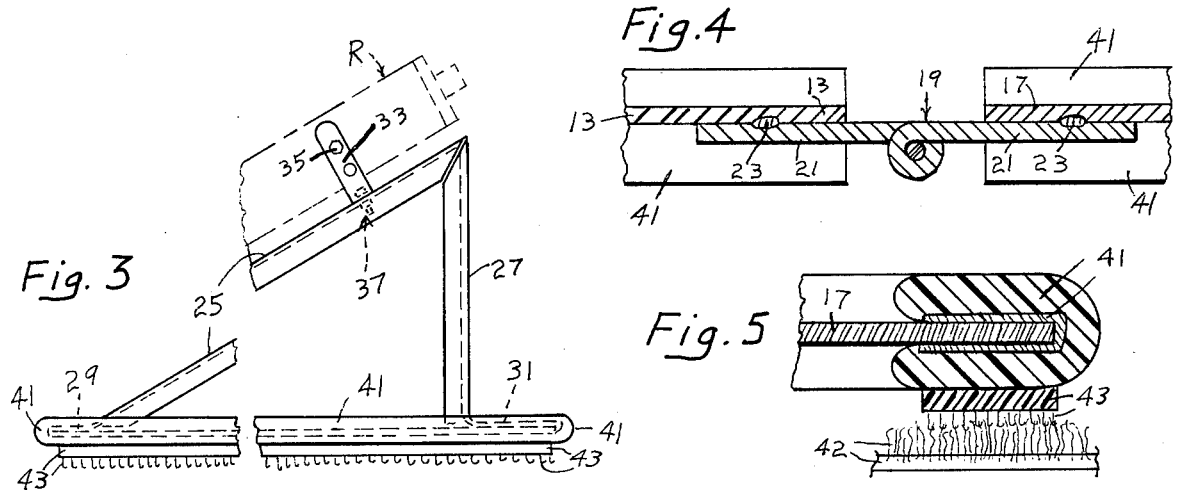

PORTABLE MOUNT FOR RADIOS IN MOTOR VEHICLES

BACKGROUND OF THE INVENTION

The prior art broadly teaches mounting electronic apparatus in or on structure straddling the floor hump of automotive vehicles. In U.S. Pat. to Krechman, No. 3,405,944, the apparatus is either loosely placed over the hump (FIGS. 1 and 2), or is semi-permanently attached to the dashboard (FIG. 3). In U.S. Pat. to Hanley, No. 3,550,001, the apparatus is also semi-permanently attached by straps bolted thereto and to the vehicle floor (FIGS. 1 and 4).

OBJECTS AND SUMMARY OF THE INVENTION

It is the principal object of this invention to provide a portable mount, especially adapted for attaching a citizens' band radio in position over the floor hump of an automotive vehicle, by structure that is quickly and easily attachable and detachable for convenience and for safety from theft or vandalism, the mount being constructed and used as set forth in the Abstract. Other objects and advantages will appear as the following detailed description proceeds.

BRIEF DESCRIPTION OF THE DRAWINGS

FIG. 1 is a plan view of the mount as laid on a flat surface.

FIG. 2 is a rearwardly facing elevational view of the structure of FIG. 1.

FIG. 3 is a fragmented elevational view taken from the left side of FIG. 2.

FIG. 4 is an enlarged fragmentary elevational view in section taken on the line 4—4 of FIG. 1.

FIG. 5 is an enlarged fragmentary sectional view taken on the line 5—5 of FIG. 2.

DETAILED DESCRIPTION

With reference now to the drawings, the numeral 11 generally designates the portable mount for supporting a citizens' band radio R or a like device over the floor hump H of a motor vehicle. The portable mount 11 comprises a base lamina 13 and a pair of lateral laminae 15 and 17 connected to the lateral edges of the base lamina 13, by continuous or piano-type hinges 19 (FIG. 4), the wings 21 of which are fixed to the adjacent laminae, as by spot welds 23.

The radio-supporting structure comprises an elongated sheet bent to define a forwardly and downwardly sloping plate 25, an upstanding plate 27, and horizontally extending end flanges 29 and 31 which overlie the end margins of the base lamina 13 and are spot welded as in FIG. 4 or otherwise fixed thereto.

The radio R is attached to the inclined plate 25 by a pair of L-shaped bracket strips 33 which are fastened to the case of the radio as by bolts 35 and to the inclined plate by bolt-and-nut pairs 37 (FIG. 3) passing through selected ones of slots 38 (FIG. 1). Both of the plates 25 and 27 are provided with a plurality of apertures 39 to permit sound from a speaker in the under surface of the radio to pass downwardly and outwardly through said plates.

The non-hinged edges of laminae 13, 15 and 17 are protectively covered by plastic-coated metallic channel members 41 crimped and/or cemented thereon. For quick and easy attachment to, or detachment from, the usual carpeted surface 42 of the humped floor of the vehicle, male or hook-type "VELCRO" strips 43 are cemented to the under surfaces of the members 41 covering the front and rear edges of the base lamina 13 and the outer side edges of the laminae 15 and 17. If no carpeting is present, female or loop-type "VELCRO" strips (not shown) can be cemented to the floor in positions to mate with the strips 41 across and laterally along the hump.

Having thus described my invention, I claim:

1. In a mounting means for quickly and easily attachably and detachably supporting a radio or like device over a hump in a floor defining a drive-shaft tunnel of a motor vehicle, the improvement comprising: a base lamina adapted to overlie the ridge of said hump, a lateral lamina swingably attached to each side margin of said base lamina in such manner that said laminae can relatively closely embrace the ridge and substantial side portions of said hump, continuous hinges for effecting said swingable attachment, channel moldng strips protectively embracing the outer edges of said base and lateral laminae, support structure attached to said base lamina and adapted for semi-permanent mounting of a radio or like device thereto, and means for quickly and easily attaching said laminae to spaced regions of said floor and said hump, said attaching means being flat strips adhesively bonded to the under faces of portions of said channel molding strips on all of said laminae, said flat strips having numerous small Velcro-type hooks projecting from their exposed under surfaces and cohesively engageable with nap or like structure on the surfaces of said floor and said hump.

2. Structure according to claim 1, said like structure being additional flat material adapted to mate with said firstmentioned flat laminae and having numerous small loops projecting from its face and cohesively engageable by said small hooks.

3. Structure according to claim 1, said channel molding comprising an inner sheet-metal channel element and a plastic coating over the outside of said sheet-metal channel element.

4. Structure according to claim 1, said support structure comprising an inclined plate fixed to said base lamina at its lower end, an upstanding plate fixed to said base lamina and at its upper edge to said inclined plate.

5. Structure according to claim 4, said plates being formed from a sheet of material bent to define said plates and horizontally flanged to overlie front and rear margins of said base lamina for attachment thereto.

6. Structure according to claim 5, said plates being perforated for improved transmission of sound downwardly and outwardly through said mounting means.

* * * * *